Patented Nov. 9, 1948

2,453,285

UNITED STATES PATENT OFFICE 2,453,285

DYESTUFFS OF THE ANTHRAQUINONE SERIES

Samuel von Allmen and Hans Eggenberger, Basel, Switzerland, assignors to Sandoz Limited, Basel, Switzerland, a Swiss firm No Drawing. Application September 19, 1945, Serial No. 617,455. In Switzerland October 19, 1944

4 Claims. (Cl. 260—371)

The present invention relates to new dyestuffs of the anthraquinone series which dye animal fibres in brilliant blue shades possessing an improved fastness to light and which do not change their shade in the artificial light.

It is known that anthraquinone compounds of the general formula

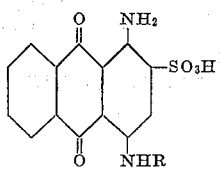

wherein R stands for a substituted or unsubstituted hydroaromatic group, dye animal fibres in very brilliant blue shades (cf. for instance German Patents 456,114; 554,324; 569,879).

It has now been found that new valuable anthraquinone dyestuffs can be produced by condensing anthraquinone compounds of the general formula

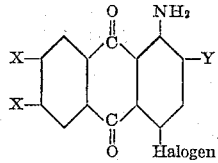

wherein Y stands for halogen or a sulpho group and wherein one of the X is a sulphonic group, the other X being hydrogen, with halogen-free hydroaromatic amines.

The dyestuffs prepared from these starting products give very brilliant shades on animal fibres and, as compared with the known dyestuffs cited above, they possess an improved fastness to light and an improved stability of the shade in the artificial light.

The present process is characterized in that the starting products are heated together at a moderated temperature in an aqueous or organic solvent medium or mixtures of these media in the presence of a catalyst, like copper or copper salt, and of an acid binding agent.

The anthraquinone compounds used as starting products are for example 1-amino-4-bromanthraquinone-2.6-disulphonic acid, 1-amino-4-chloranthraquinone-2.6-disulphonic acid, 1-amino-4-bromanthraquinone - 2.7 - disulphonic acid, 1-amino-4 - chloranthraquinone - 2.7 - disulphonic acid or their salts. It is also possible to use as starting compounds a mixture of these different anthraquinone compounds.

The hydroaromatic bases which are free from halogen must contain the amino group linked to the hydrogenated ring; such bases are for instance the hexahydroaniline, -toluidine, -xylidine, the 1.2.3.4-tetrahydro-1- or -2-naphthylamines and the like.

The same dyestuffs can also be prepared by condensing, in the presence of a catalyst and of an acid binding agent, the 1-amino-2.4-dihalogenanthraquinone-6- or -7-sulphonic acids, their salts of their mixtures with the above said hydroaromatic amines, and after the separation of the intermediate products thus formed, by subjecting them to a treatment with a sulphite in order to replace the β-halogen atom by a sulphonic acid group.

The dyestuffs prepared according to the present process are very easily soluble in water and dye wool as well as other animal fibres and also artificial fibres, like nylon, in beautiful blue shades of a great purity. These dyeings possess an excellent fastness to light and do not change their shade in the artificial light.

The following examples, in which the parts are by weight, illustrate the present invention:

Example 1

13 parts of the sodium salt of 1-amino-4-bromanthraquinone-2.6 - disulfonic acid are slowly added at 65° C. in the course of 9 hours under stirring to a mixture consisting of 80 parts of water, 34 parts of hexahydroaniline, 4 parts of a 33% aqueous sodium hydroxide solution, 0.1 part of copper powder, whereby a nitrogen stream is allowed to flow in simultaneously. After the addition of the anthraquinone derivative stirring is continued for further 3 hours at 65° C. and then the blue condensation mass subjected to the steam-distillation in order to regenerate the excess of hexahydroaniline. Thereon the dyestuff is salted out and worked up in the usual manner.

In dry form it is a blue powder, easily soluble in water, dyeing wool and other animal fibres and artificial fibres like nylon in beautiful blue shades possessing a great purity. The dyeings are fast to light and do not change in the artificial light.

If, instead of the sodium salt of 1-amino-4-bromanthraquinone-2.6-disulphonic acid, a corresponding quantity of the sodium salt of 1-amino - 4 - chloranthraquinone-2.6 - disulphonic acid is used and the condensation conducted in the manner described above, an identical dyestuff will be obtained.

Example 2

If, instead of 13 parts of the sodium salt of 1-amino-4-bromanthraquinone-2,6-disulphonic acid, there is used the same quantity of its isomer containing the sulphonic groups in 2.7-positions, and worked up in the manner described in Example 1, a blue dyestuff will be obtained which is an isomeric compound of that of Example 1 and possesses very similar properties.

Example 3

13 parts of the mixture of the sodium salts of 1-amino-4-bromanthraquinone-2.6- and -2.7-disulphonic acid are condensed in the manner described in Example 1 with 34 parts of hexahydroaniline. Thus a mixture of the isomeric dyestuffs described in Examples 1 and 2 will be obtained.

Example 4

13 parts of the sodium salt of 1-amino-4-bromanthraquinone-2.6-disulfonic acid are added at 65° C. under good stirring in 12 hours to a mixture of 80 parts of water, 40 parts of hexahydro-o-toluidine, 4 parts of a 33% aqueous sodium hydroxide solution, 0.2 part of copper sulfate, a moderate nitrogen stream being introduced simultaneously. Thereupon the mass is stirred for further 3 hours at 65° C. and the dyestuff worked up in the usual way. It dyes wool in beautiful blue shades.

Example 5

13 parts of the sodium salt of 1-amino-4-bromanthraquinone-2.6-disulfanic acid are slowly introduced within 18 hours under stirring into a mixture of 60° C. consisting of 60 parts of water, 60 parts of 2-amino-1.2.3.4-tetrahydronaphthalene, 4 parts of a 33% aqueous sodium hydroxide solution, 0.2 part of copper powder and 20 parts of ethyl-alcohol, a moderate nitrogen stream being allowed to flow in simultaneously. After a further 6 hours' stirring at 60° C. the condensation is terminated. The dyestuff is worked up in the manner described above. In dry state it is a blue powder being easily soluble in water, dyeing wool and other animal fibres in blue shades of a great purity and of a good fastness to light.

The isomeric dyestuff possessing the sulphonic acid groups in 2- and 7-positions possesses similar properties.

A similar dyestuff will also be obtained, if 2-amino-1.2.3.4-tetrahydronaphthalene is replaced by its isomer containing the amino group in 1-position.

Example 6

The same dyestuff as described in Example 1 may be obtained by condensing in the same manner 11 parts of the potassium salt of 1-amino-2-4-dibromanthraquinone-6-sulfonic acid with 34 parts of hexahydroaniline and transforming the dyestuff thus obtained into the product sulfonated in 2-position by a treatment with sulfite according to the usual methods.

What we claim is:

1. An anthraquinone dyestuff of the formula

[Structure: anthraquinone with X substituents, $NH_2$, $SO_3H$, and NHR groups]

wherein one X stands for a sulfo group and the other X stands for hydrogen, and wherein R stands for a member selected from the group consisting of hexahydrophenyl, hexahydrotolyl, hexahydroxylyl and ac-tetrahydronaphthyl.

2. The anthraquinone dyestuff of the formula

[Structure: anthraquinone with $NH_2$, $SO_3H$, $HO_3S$, and NH-CH-cyclohexyl group]

which dyestuff dyes animal fibres into brilliant blue shades being fast to light and stable in the artificial light.

3. The anthraquinone dyestuff of the formula

[Structure: anthraquinone with $NH_2$, $SO_3H$, $HO_3S$, and NH-CH-methylcyclohexyl group]

which dyestuff dyes animal fibres into brilliant blue shades being fast to light and stable in the artificial light.

4. The anthraquinone dyestuff of the formula

[Structure: anthraquinone with $NH_2$, $SO_3H$, $HO_3S$, and NH-CH-tetrahydronaphthyl group]

which dyestuff dyes animal fibres into brilliant blue shades being fast to light and stable in the artificial light.

SAMUEL von ALLMEN.
HANS EGGENBERGER.

REFERENCES CITED

The following references are of record in the file of this patent:

UNITED STATES PATENTS

| Number | Name | Date |
| --- | --- | --- |
| 1,688,256 | Weinand | Oct. 16, 1928 |
| 1,821,043 | Weinand | Sept. 1, 1931 |
| 1,843,308 | Weinand | Feb. 2, 1932 |
| 2,067,469 | Weinand et al. | Jan. 12, 1937 |

FOREIGN PATENTS

| Number | Country | Date |
| --- | --- | --- |
| 381,954 | Great Britain | Oct. 3, 1932 |
| 462,694 | Great Britain | Mar. 15, 1937 |